United States Patent Office 3,316,620
Patented May 2, 1967

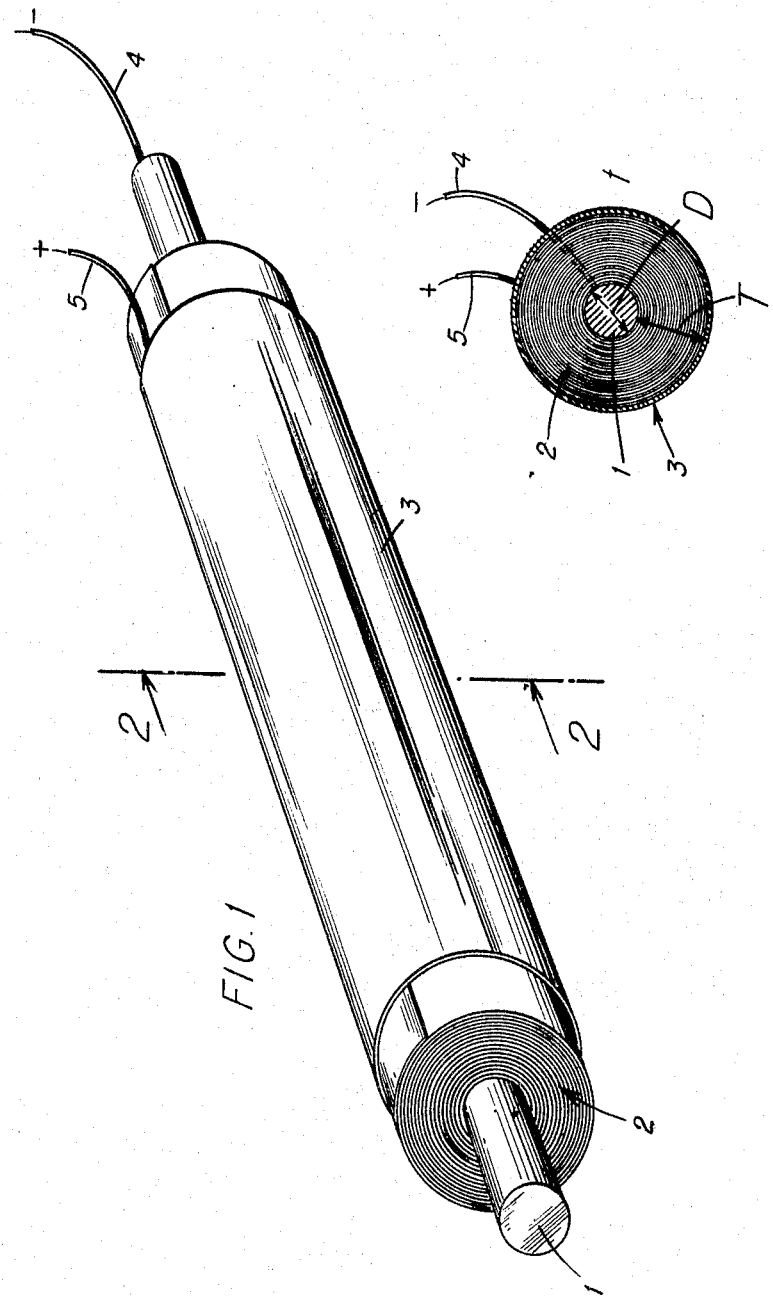

3,316,620
PROCESS FOR THE PRODUCTION
OF ELECTRETS
Lawrence Lee Stewart, Jr., Richmond, Va., assignor to
Philip Morris Incorporated, New York, N.Y., a corporation of Virginia
Filed Feb. 28, 1964, Ser. No. 348,067
4 Claims. (Cl. 29—155.5)

This invention relates to a process for the production of electrets. More particularly, the present invention relates to an improved process for the production of electrets in large quantities.

It is an object of the present invention to produce a large number of electrets at one time.

It is a further object of this invention to produce electrets by a simple and economical method.

It is a further object of the present invention to produce electrets by a commercially practical process.

The term "electret" is employed throughout this specification to designate an electrified substance which exhibits electrical charges of opposite sign on opposite faces, the electrification being throughout the entire volume of the substance, rather than merely on its surface.

Many materials have been made into electrets of one form or another. However, until the present invention, electrets have been made by methods which have not permitted their production in large quantities at one time. The known methods for producing electrets have been directed, essentially, at the production of only one or at most only a limited number of electrets at one time. To produce relatively large numbers of electrets in the time required to produce a single electret, such methods require large amounts of equipment and floor space. Thus, prior to the present invention, no commercially practical process for the production of electrets was known.

The present invention, provides, for the first time, a commercially practical method for the production of electrets in large quantities.

In accordance with the general method of the present invention, an electret-forming material is wrapped around an electrically conductive core and an electrically conductive sheath is then wrapped around the electret-forming material. A direct current is then applied to the resulting structure in such a manner that the core comprises a first electrode and the sheath comprises a second electrode, whereby an electric field is imposed on the electret-forming material.

More specifically, the process of the present invention includes the following steps:

The electret-forming material is preferably employed in the form of a continuous flexible film or sheet. It may also be in the form of tapes or ribbons and the like, if desired. It is important, however, that the electret-forming material be sufficiently flexible so that it can be wrapped around the particular core material being used.

Electret-forming materials which may be employed include any of the known electret-forming materials or any similar material which can be formed into a film or sheet. For example the electret-forming material may be a material such as cellulose acetate, polyethylene terephthalate, poly (vinylidenechloride), poly (chlorotrifluoroethylene), poly (tetrafluoroethylene), poly (vinylchloride), poly (methylmethacrylate) and the like.

The sheet or film may vary in thickness from about 0.1 to 60 mils and may be any desired width, for example it may be an inch or less in width or it may be 10 feet or more in width.

The electret-forming material is wrapped around an electrically conductive core, which may be in the form of a solid or hollow rod of metal. The core may be comprised of any electrically conductive material but is preferably made of any metal which will conduct an electric current, for example, steel, copper, brass, aluminum or the like. It may, of course, comprise a solid or hollow rod made of any relatively rigid material, including conducting and non-conducting materials, which is covered by or has incorporated within it an electrically conductive material. For example, it may be in the form of a wooden pole or a steel rod which is covered with aluminum foil. In any event, the electrically conductive material is connected to a suitable source of electricity.

While the core material may have any desired cross-section, it is preferably circular in cross-section in order to provide uniformity of field strength. In addition, in order to provide the greatest possible uniformity of field strength, it is preferable that the thickness of the rod, i.e., the diameter of the circle which is its cross-section, is many times greater than the thickness of the electret-forming material. This relationship will be more apparent in the light of the discussion of FIG. 2 which appears later in this specification.

The electret-forming material is wrapped snugly around the core to form from about one to about 10,000 or more layers of the film. When the core is circular in cross-section, each layer of the film will have a substantially cylindrical shape. Preferably, the electret-forming material is wrapped around the core to form from about 5 to about 1000 layers. Each layer may be separate or the material may be used to form, in one continuous piece, all layers or the material may be applied in any number of pieces to form the desired number of layers. The number of layers which are formed about the core will depend somewhat on the thickness of the film and on the amount of the field which is imposed on the material, as will be described below. Generally, however, the total thickness of the electret-forming material on the core, including all layers of the electret-forming material which are wrapped around the core material, will be between about 0.1 and 1000 mils, although in large scale equipment this thickness could be considerably larger.

After the electret-forming material has been wrapped around the core material, an electrically conducting sheath is then wrapped around the outer layer of the electret-forming material. The sheath may be a foil, for example aluminum foil, tin foil or the like, or it may be a relatively thin metal sheeting, such as aluminum sheeting, tin sheeting, stainless steel sheeting and the like. It may also be a stiff or relatively stiff material which can be clamped or otherwise held in close abutment with the outer surface of the electret-forming material. However, the metal sheet or outer electric conductor is preferably wrapped around the outer layer of the electret-forming material, the outer conducting material preferably being a flexible material. In order to prevent leakage of current, it is preferred that the outer conducting sheath be narrower, axially than the electret-forming material. However, the outer sheath may be as wide as the electret-forming material provided that the field is kept below the dielectric strength of the surrounding air.

The assembly of the present invention comprising an inner electrically conducting core, middle layer or layers of electret-forming material and outer electrically conducting sheath is illustrated in the attached drawing.

In the drawing:

FIG. 1 is a diagrammatic isometric view of the assembly of parts which is produced during the process of the present invention.

FIG. 2 is a cross-sectional view of the assembly shown in FIG. 1, taken along the lines 2—2.

Referring to the figures, an inner core 1 comprised of electrically conducting material is wrapped with a plurality of layers of electret-forming material 2. Outer sheath 3, made of electrically conducting material, is wrapped around the outermost layer of the electret-forming material. Electrical conduit 4 is attached to inner core 1 and is connected to a source of direct current (not shown). Electret conduit 5 is connected to outer electrically conductive material 3 and is connected to a ground (not shown).

In FIG. 2, the diameter or inner core 1 is shown as D and the thickness of the electret-forming material is shown at $t$. The thickness of the total number of layers of electret-forming material is shown as T. In the most preferred embodiment of the present invention, the thickness of the electret-forming material, the number of layers of electret-forming material and the diameter of the inner core should bear the following relationstip: D should be at least 100 times and preferably should be at least 1000 times or more as large as $t$. D should be at least 100 times and should preferably be at least 250 times as large as T. When there are many layers of electret-forming material, for example when T is 10 to 50 times or more as great as $t$, D should preferably be as large as possible, for example 4000 or more times as large as $t$ and preferably 1000 or more times as large as T. In terms of inches, a core of 4 or 5 inches will generally be satisfactory when there are from 1 to 10 layers of 1 mil thick electret-forming material. When thicker electret-forming material or more layers are employed, the core should preferably be larger, for example a core of one foot or more in diameter could be employed. Obviously, the larger the core diameter, the more uniform will be the electric field and a core of several feet or more in diameter could be employed when many layers of a thick electret-forming material are wrapped around the core.

After the configuration of parts shown above has been prepared, it is then heated, for example in an oven, to a temperature of from about 23° C. to about 300° C., and preferably from about 50 to about 200° C. The temperature may be as high as the softening point of the electret-forming material, but should never be as high as the melting point of the electret-forming material. Thus, for example, when the electret-forming material is polyethylene terephthalate, the temperature may vary between about 90° C. and 170° C. The assembly is brought to that temperature range and maintained there for a pre-heating period or step for at least one minute. The pre-heat period may last one hour or longer but is preferably from about 10 to about 30 minutes and is preferably conducted at atmospheric pressure, although higher or lower pressures could be employed, if desired.

After the pre-heating step, the assembly is subjected to a second step, wherein it is maintained at a temperature of from about 23° C. to about 300° C., the upper temperature being below the softening point of the electret-forming material, and a voltage is applied between the inner electrically conducting core and the outer electrically conducting sheath to give a field strength of from about 10 to 300 kilovolts per centimeter and preferably from about 20 to about 200 kilovolts per centimeter. The voltage is maintained in this manner for a period of from about 0.01 second to about 1 day or even longer and is preferably maintained for a period of from about 15 seconds to about 5 hours.

The electric field is provided by means of any suitable direct current power supply, which is connected to a pair of electrodes, generally concentric cylinders. The voltage which is required, which will depend on the spacing of the cylinders, may be determined from the formula $$F = \frac{V}{d}$$

where F is the electric field (in kilovolts per centimeter), V is the voltage applied between the cylinders (in kilovolts) and $d$ is the distance between the cylinders (in centimeters). Thus, for example a voltage of 4 kilovolts (4,000 volts) will be necessary to provide a field of about 200 kilovolts per centimeter, when the spacing between the cylinders is about 0.02 cm.

After the electret-forming material has been subjected to the above-described second step, it is subjected to a third step wherein the voltage is continued with the same range as in the second step but the heating is terminated and the assembly is permitted to cool while still being kept in the same electric field. The assembly is permitted to cool under these conditions until the electret-forming material has reached room temperature (about 20–30° C. The assembly can then be disassembled and the electret-forming material recovered therefrom. Since the electret-forming material has been formed as a large sheet of material, it can then be cut up into pieces of any desired size or can be used in one continuous tape or the like when the outer electrically conducting sheath, which is employed, is narrower than the sheet of electret-forming material. The portions of electret-forming material which were not exposed to an electric field can be cut off, if desired.

The charge on the various layers of electret-forming material can be determined, after removal from the field, by measurements at randomly selected points on each layer by using a dissectible capacitor and an electrometer. A lead is run from each side of the electret-forming material at the point to be tested. The two leads are run through the dissectible capacitor to the electrometer, from which a reading can be taken. In this manner it can be determined whether or not there is a uniform charge on the electret-forming material. If the charge varies in some layers, it can be made more uniform in a subsequent charging operation with the same configuration of the same electret-forming material by increasing somewhat the field strength and/or the time of charging. A substantially uniform charge can readily be given to the various layers of electret-forming material.

The invention is illustrated by the following examples:

EXAMPLE 1

An aluminum tube six inches long and having a diameter of four inches was wrapped with aluminum foil to form an aluminum core. A single piece of Mylar film (polyethylene terephthalate) one mil thick and six inches wide was wrapped four layers deep about the aluminum core. A strip of aluminum foil 5.5 inches wide was wrapped snugly around the Mylar to form a sheath. The resulting assembly was placed in a heated compartment equipped with temperature controls, with a fan for equalization of internal temperature, and with a high voltage direct current power supply (a Sorensen power supply having a voltage range of 0 to 30,000 volts). The heated compartment during the electret formation was operated unled atmospheric pressure and at a temperature of 150° C. Heating at 150° C. was continued for one hour, at which time the outer aluminum foil was connected to a ground and the aluminum core was connected to the negative voltage output of the power supply. A potential of −50 kv./cm. was applied to the core. After three hours of charging in this manner, the assembly was cooled to room temperature under the same electric field. Then the potential was removed and the electret was unrolled from the aluminum tube. The charge of the electret was measured at randomly selected points on each layer by using an appropriate capacitor and electrometer. The voltage reading of the electrometer was then converted to charge density by use of the formula given below:

$$Q = \frac{-CV}{A}$$

where

Q is charge density
C is capacitance of the capacitor
A is area of the movable electrode
V is voltage read on the electrometer
The results are given in Table I below.

*Table I.—Charges on 4-layer rolled electret*

|  | Surface charge density $10^{-9}$ coul./cm.$^2$ |
|---|---|
| Layer No. 1 (outside layer): | |
| Outside surface | −4.9 |
| Inside surface | +4.9 |
| Layer No. 2: | |
| Outside surface | −4.9 |
| Inside surface | +4.8 |
| Layer No. 3: | |
| Outside surface | −4.7 |
| Inside surface | +4.6 |
| Layer No. 4 (inside layer): | |
| Outside surface | −4.6 |
| Inside surface | +4.5 |

EXAMPLE 2

Mylar film of 1 mil thickness was treated as in Example 1 except that the charging time was 32 minutes. The resulting surface charge was measured by the use of an appropriate capacitor and electrometer. The voltage reading of the electrometer was then converted to charge density by the formula given in Example 1. The results are given below in Table II.

*Table II.—Charges on rolled electret*

|  | Surface charge density $10^{-9}$ coul./cm.$^2$ |
|---|---|
| Layer No. 1 (outer layer): | |
| Outside surface | −3.3 |
| Inside surface | +3.7 |
| Layer No. 2: | |
| Outside surface | −3.2 |
| Inside surface | +3.4 |
| Layer No. 3: | |
| Outside surface | −3.2 |
| Inside surface | +3.4 |
| Layer No. 4 (inner surface): | |
| Outside surface | −3.7 |
| Inside surface | +3.5 |

EXAMPLE 3

An aluminum tube six inches long and having a diameter of four inches was wrapped with aluminum foil. A single piece of Mylar film (polyethylene terephthalate) one mil thick and six inches wide was wrapped forty layers deep about the aluminum core. A strip of aluminum foil 5.5 inches wide was wrapped snugly around the Mylar to form a sheath. The resulting assembly was placed in a heated compartment equipped with temperature controls, with a fan for equalization of internal temperature, and with a high voltage direct current power supply (a Sorensen power supply having a voltage range of 0 to 30,000 volts). The heated compartment during the electret formation was operated under atmospheric pressure and at a temperature of 150° C. Heating at 150° C. was continued for one hour, at which time the outer aluminum foil was connected to a ground and the aluminum core was connected to the negative voltage output of the power supply. A potential of −50 kv./cm. was applied to the core. After 1.3 hours of charging in this manner, the assembly was cooled to room temperature under the same electric field. Then the potential was removed and the electret was unrolled from the aluminum tube. The charge of the electret was measured at randomly selected points on each layer by using an appropriate capacitor and electrometer. The voltage reading of the electrometer was then converted to charge density as described in Example 1. The results are given in Table III, below.

*Table III.—Charges on 40-layer rolled electret*

|  | Surface charge density $10^{-9}$ coulombs/cm.$^2$ |
|---|---|
| Layer number 1 (outside to inside): | |
| Outer surface | −3.3 |
| Inner surface | +3.2 |
| Layer number 10: | |
| Outer surface | −4.3 |
| Inner surface | +3.4 |
| Layer number 20: | |
| Outer surface | −3.2 |
| Inner surface | +3.7 |
| Layer number 30: | |
| Outer surface | −3.1 |
| Inner surface | +3.2 |
| Layer number 40: | |
| Outer surface | −3.3 |
| Inner surface | +3.1 |

EXAMPLE 4

An aluminum tube six inches long and having a diameter of four inches was wrapped with aluminum foil to form an aluminum core. A single six-inch wide piece of polychlorotrifluoroethylene (Kel-F) of a 5-mil thickness was wrapped two layers deep about the aluminum core. A strip of aluminum foil 5.5 inches wide was wrapped snugly around the Kel-F to form a sheath. The resulting assembly was placed in a heated compartment, similar to the one described in Example 1, which contained a high voltage direct current power supply. The heated compartment was operated under atmospheric pressure and at a temperature of 70° C. Heating at 70° C. was continued for one hour, at which time the outer aluminum foil was connected to a ground and the aluminum core was connected to the negative voltage output of the power supply. A potential of −2 kv. was applied to the core with a resulting field strength of −80 kv./cm. This field was maintained for 72 hours at 70° C., after which the assembly was cooled to room temperature under the same electric field. Then the potential was removed and the electret was unrolled from the aluminum tube. The charge of the electret was measured at randomly selected points on both layers by using an appropriate capacitor and electrometer. The voltage reading of the electrometer was converted to charge density as described in Example 1. The results are given in Table IV, below.

*Table IV.—Charges on a 2-layer rolled electret of Kel-F*

|  | Surface charge density $10^{-9}$ coul./cm.$^2$ (Heterocharge) |
|---|---|
| Layer number 1 (outer layer): | |
| Outside surface | −8.8 |
| Inside surface | +8.8 |
| Layer number 2: | |
| Outside surface | −8.0 |
| Inside surface | +8.0 |

EXAMPLE 5

Using the same equipment as described in Example 1, a four-layer roll of cellulose acetate, 3 mils in thickness and 5.5 inches wide, was prepared as an assembly. This assembly was preheated at 70° C. for one hour in the heated compartment described in Example 1. Then the outer aluminum foil wrap was connected to a ground and the core was connected to the negative voltage output of the power supply. A potential of −1 kv. was applied to the core, resulting in a field strength of 33 kv./cm. Charging was continued at this level for 16 hours, at 70° C., after which the assembly was cooled, while maintained under the electric field, for one hour. The electret was then unrolled from the aluminum tube, the charge measured as described previously, at randomly selected points on each layer. Charge density was calculated as described in Example 1 and the results are given in Table V, below.

Table V.—Charge measurements—cellulose acetate electrets

Surface charge density
$10^{-9}$ coul./cm.$^2$
(Heterocharges)

Layer number 1 (outer layer):
    Outside surface ---------------------------- −2.0
    Inside surface ----------------------------- +2.7
Layer number 2:
    Outside surface ---------------------------- −1.9
    Inside surface ----------------------------- +2.6
Layer number 3:
    Outside surface ---------------------------- −2.7
    Inside surface ----------------------------- +2.4
Layer number 4:
    Outside surface ---------------------------- −3.0
    Inside surface ----------------------------- +2.4

EXAMPLE 6

Following the same general procedure given in Example 1, a single layer of polyvinyl chloride (thickness 20 mils) was wrapped around an aluminum core, then preheated at 70° C. for one hour, and a potential of −10 kv. applied to the inner electrode (the aluminum core). The assembly was charged at a field strength of −200 kv./cm. for two minutes, then cooled under the same electric field for two hours. The charge of the electret was measured as described in Example 1 at randomly selected points, and the charge density calculated as specified in the examples above. Table VI below shows the charge measurements which were obtained.

Table VI.—Charge measurement (polyvinyl chloride)

Surface charge density
$10^{-9}$ coul./cm.$^2$
(Homocharge)

Outer surface ------------------------------ +7.6
Inner surface ------------------------------ −7.6

By operating in accordance with the present invention, very large pieces of electret material can be prepared with great simplicity, in a minimum of space and with a minimum amount of time and equipment. The power which is required is less than would be required by conventional production of electrets and the cost of producing electrets in accordance with the present invention is greatly reduced over the cost of producing a comparable number of electrets by the old methods. Electrets which are formed in accordance with the present invention may be employed in any of the uses which are already known for electrets. For example, they can be employed in devices where a permanent or semi-permanent electrostatic charge is required, such as in electrostatic filters, dosimeters, microphones, electrometers, vibration meters and similar devices. For example, they may be employed as dosimeters, as is disclosed in co-pending application Serial No. 339,101, which is directed to polyethylene terephthalate electrets and a method for their production.

I claim:
1. A process for the production of electrets which comprises wrapping at least one layer of an insulated electret-forming mterial around an electrically conducting core, placing an electrically conducting sheath around said electret-forming material, heating the assembly to a predetermined temperature for a predetermined time, applying a direct current electrical field between said core and said sheath, and separating said electret-forming material from said core and said sheath after termination of said heat and field applications.

2. A process for the production of electrets which comprises wrapping at least one layer of an electret-forming material around an electrically conducting core, placing an electrically conducting sheath around said electret-forming material to form an assembly, maintaining said assembly at a range between room temperature and a temperature below the softening point of said electret-forming material and maintaining the assembly within that temperature range for a period of 0.01 second to several days, applying an electrical field of from about 1 to about 200 kilovolts per centimeter between the core and the sheath, while maintaining the assembly at a temperature within said range, maintaining said electrical field while said assembly is cooled to room temperature and removing the resulting electret material from said core and sheath.

3. The process of claim 1 wherein said electret-forming material is polyethylene terephthalate.

4. The process of claim 2 wherein said electret-forming material is polyethylene terephthalate.

References Cited by the Examiner

UNITED STATES PATENTS 2,785,350    3/1957    Toppari --------- 29—155.5 X
2,842,653    7/1958    Clemens --------- 29—25.42 X JOHN F. CAMPBELL, *Primary Examiner.*

WILLIAM I. BROOKS, *Examiner.*